United States Patent
Hederstierna et al.

(10) Patent No.: US 10,206,127 B2
(45) Date of Patent: Feb. 12, 2019

(54) METHODS AND A DEVICE FOR SUPERVISING A HOME WIRELESS SYSTEM

(71) Applicant: Verisure Sàrl, Versoix (CH)

(72) Inventors: Fredrik Hederstierna, Bjärred (SE); Philip Alan Munts, Vellinge (SE)

(73) Assignee: Verisure Sàrl, Versoix (CH)

( * ) Notice: Subject to any disclaimer, the term of this patent is extended or adjusted under 35 U.S.C. 154(b) by 0 days.

(21) Appl. No.: 14/382,640

(22) PCT Filed: Mar. 8, 2013

(86) PCT No.: PCT/EP2013/054747
§ 371 (c)(1),
(2) Date: Sep. 3, 2014

(87) PCT Pub. No.: WO2013/135582
PCT Pub. Date: Sep. 19, 2013

(65) Prior Publication Data
US 2015/0055487 A1 Feb. 26, 2015

(30) Foreign Application Priority Data

Mar. 12, 2012 (EP) .................................. 12159019
Dec. 5, 2012 (EP) .................................. 12195592

(51) Int. Cl.
*H04W 24/04* (2009.01)
*H04W 76/11* (2018.01)
(Continued)

(52) U.S. Cl.
CPC ............ *H04W 24/04* (2013.01); *G05B 15/02* (2013.01); *H04L 12/2803* (2013.01);
(Continued)

(58) Field of Classification Search
None
See application file for complete search history.

(56) References Cited

U.S. PATENT DOCUMENTS

| 4,660,024 A | 4/1987 | McMaster |
| 4,821,027 A | 4/1989 | Mallory |

(Continued)

FOREIGN PATENT DOCUMENTS

| EP | 2104302 A1 | 9/2009 |
| GB | 2457102 A | 8/2009 |

(Continued)

OTHER PUBLICATIONS

International Search Report dated Aug. 29, 2012 for Intl. Pat. Application No. PCT/EP2012/062687, 4 pages, European Patent Office, Rijswijk, The Netherlands.

(Continued)

*Primary Examiner* — George C Atkins
(74) *Attorney, Agent, or Firm* — Fredrikson & Byron, P.A.

(57) ABSTRACT

A method and a device for supervising a home wireless system wherein the home wireless system comprises a plurality of peripheral wireless nodes (14; 16; 19; 21; 23), a first gateway (12) having wireless communication means for communicating with and controlling associated peripheral wireless nodes. Other steps are installing at least one second gateway (12'; 32), each of said peripheral wireless nodes (14; 16; 19; 21; 23) being assigned to one of said first gateway (12) and said at least one second gateway (12'; 32), maintaining a supervision timer for each assigned peripheral wireless node (14; 16; 19; 21; 23), transmitting from each of said peripheral wireless nodes (14; 16; 19; 21; 23) a periodic status message, resetting in the gateway said supervision timer when receiving a periodic status message from an assigned peripheral wireless node (14; 16; 19; 21; 23), and reporting from a first gateway to said at least one second gateway an assigned peripheral wireless node (14; 16; 19; 21; 23) as failed when no periodic status message has been (Continued)

received within a predefined time period. The device also comprises at least on remote central monitoring station (22) and timing means in said gateways and said nodes.

4 Claims, 3 Drawing Sheets

(51) Int. Cl.
| | | |
|---|---|---|
| *H04W 88/16* | (2009.01) | |
| *G05B 15/02* | (2006.01) | |
| *H04L 12/28* | (2006.01) | |
| *H04L 12/24* | (2006.01) | |
| *H04W 12/04* | (2009.01) | |
| *H04W 48/08* | (2009.01) | |
| *H04W 56/00* | (2009.01) | |
| *H04W 4/70* | (2018.01) | |
| *H04W 60/00* | (2009.01) | |
| *H04L 29/08* | (2006.01) | |
| *H04W 84/20* | (2009.01) | |

(52) U.S. Cl.
CPC ...... *H04L 12/2807* (2013.01); *H04L 12/2816* (2013.01); *H04L 41/0806* (2013.01); *H04W 12/04* (2013.01); *H04W 48/08* (2013.01); *H04W 56/001* (2013.01); *H04W 76/11* (2018.02); *H04W 88/16* (2013.01); *H04L 67/125* (2013.01); *H04L 2012/2841* (2013.01); *H04W 4/70* (2018.02); *H04W 60/00* (2013.01); *H04W 84/20* (2013.01)

(56) References Cited

U.S. PATENT DOCUMENTS

| | | | |
|---|---|---|---|
| 5,093,656 A | 3/1992 | Dipoala | |
| 6,570,496 B2 | 5/2003 | Britton | |
| 6,690,798 B1 | 2/2004 | Dent | |
| 6,895,082 B2 | 5/2005 | Parker | |
| 6,999,562 B2 | 2/2006 | Winick | |
| 7,843,807 B2* | 11/2010 | Thomson | H04W 88/08 370/216 |
| 7,961,674 B2 | 6/2011 | Jing et al. | |
| 8,022,843 B2 | 9/2011 | Mitchell et al. | |
| 8,410,923 B2 | 4/2013 | Wang | |
| 9,110,848 B1 | 8/2015 | Kim | |
| 9,258,593 B1 | 2/2016 | Chen | |
| 9,367,697 B1 | 6/2016 | Roth | |
| 2002/0026531 A1 | 2/2002 | Keane | |
| 2002/0061748 A1 | 5/2002 | Nakakita | |
| 2002/0103898 A1 | 8/2002 | Moyer | |
| 2002/0112076 A1 | 8/2002 | Rueda | |
| 2003/0067889 A1 | 4/2003 | Petite | |
| 2003/0088698 A1* | 5/2003 | Singh | H04L 12/4641 709/239 |
| 2004/0057428 A1 | 3/2004 | Gerstner | |
| 2004/0117624 A1 | 6/2004 | Brandt | |
| 2004/0212503 A1 | 10/2004 | Stilp | |
| 2005/0059396 A1 | 3/2005 | Chuah | |
| 2005/0073574 A1 | 4/2005 | Krisbergh | |
| 2005/0192037 A1 | 9/2005 | Nanda | |
| 2005/0275528 A1 | 12/2005 | Kates | |
| 2006/0132301 A1 | 6/2006 | Stilp | |
| 2006/0132303 A1 | 6/2006 | Stilip | |
| 2006/0143295 A1 | 6/2006 | Costa-Requena | |
| 2007/0256085 A1 | 11/2007 | Reckamp | |
| 2008/0019313 A1 | 1/2008 | Vogety | |
| 2008/0293404 A1 | 11/2008 | Scherzer et al. | |
| 2009/0058630 A1 | 3/2009 | Friar | |
| 2009/0201866 A1 | 3/2009 | Watteyne et al. | |
| 2009/0204814 A1 | 8/2009 | Fisher | |
| 2009/0252032 A1 | 10/2009 | Jiang et al. | |
| 2010/0045447 A1 | 2/2010 | Mollenkopf | |
| 2010/0083356 A1* | 4/2010 | Steckley | H04L 12/2818 726/5 |
| 2010/0124918 A1* | 5/2010 | Agashe | H04W 36/0083 455/423 |
| 2010/0150122 A1 | 6/2010 | Berger | |
| 2010/0194582 A1 | 8/2010 | Petite | |
| 2010/0217837 A1 | 8/2010 | Ansari | |
| 2010/0257584 A1 | 10/2010 | Meenan et al. | |
| 2010/0265867 A1 | 10/2010 | Becker | |
| 2011/0037593 A1 | 2/2011 | Folsy | |
| 2011/0103393 A1 | 5/2011 | Meier | |
| 2011/0131302 A1 | 6/2011 | Bulusu | |
| 2011/0131645 A1* | 6/2011 | Johnson | G06F 11/0709 726/12 |
| 2011/0140910 A1 | 6/2011 | Olson | |
| 2011/0141884 A1 | 6/2011 | Olsson et al. | |
| 2011/0159871 A1 | 6/2011 | Choo | |
| 2011/0261795 A1* | 10/2011 | Honegger | H04W 24/04 370/338 |
| 2011/0302408 A1 | 12/2011 | McDermott et al. | |
| 2012/0063428 A1 | 3/2012 | Ng et al. | |
| 2012/0069842 A1 | 3/2012 | Reddy | |
| 2012/0275490 A1 | 11/2012 | Courtice | |
| 2013/0031037 A1 | 1/2013 | Brandt | |
| 2013/0107697 A1 | 5/2013 | Chien | |
| 2013/0294374 A1 | 11/2013 | Li | |
| 2015/0082414 A1* | 3/2015 | Dawes | H04L 12/2825 726/12 |

FOREIGN PATENT DOCUMENTS

| | | |
|---|---|---|
| RU | 2399095 C1 | 9/2010 |
| WO | 2004010398 A1 | 1/2004 |

OTHER PUBLICATIONS

International Search Report dated Jul. 17, 2013 for Intl. Pat. Application No. PCT/EP2013/054712, 3 pages, European Patent Office, Rijswijk, The Netherlands.

International Search Report dated Jul. 1, 2013 for Intl. Pat. Application No. PCT/EP2013/054713, 3 pages, European Office, Rijswijk, The Netherlands.

International Search Report dated Aug. 16, 2013 for Intl. Pat. Application No. PCT/EP2013/054752, 3 pages, European Patent Office, Rijswijk, The Netherlands.

International Search Report dated Aug. 20, 2013 for Intl. Pat. Application No. PCT/EP2013/054760, 4 pages, European Patent Office, Rijswijk, The Netherlands.

3rd Generation Partnership Project; Technical Specification Group Services and System Aspects; General Packet Radio Service (GPRS) enhancements for Evolved Universal Terrestrial Radio Access Network (E-UTRAN) access (Release 11), vol. SA WG2, No. V11.0.0, pp. 1-287, XP050554520, 3GPP Standard; 3GPP TS 23.401, Dec. 14, 2011 3rd Generation Partnership Project (3GPP), Mobile Competence Centre; 650, route des Lucioles; F-06921 Sophia-Antipolis Cedex; France.

3rd Generation Partnership Project; Technical Specification Group Services and System Aspects; System Improvements for Machine-Type Communications (Release 11), vol. SA WG2, No. V1.6.1, pp. 1-165, XP050555302, 3GPP Standard; 3GPP TR 23.888, Mar. 5, 2012 3rd Generation Partnership Project (3GPP), Mobile Competence Centre; 650, route des Lucioles; F-06921 Sophia-Antipolis Cedex; France.

3rd Generation Partnership Project; Technical Specification Group Core Network and Terminals; Mobile radio interface Layer 3 specification; Core network protocols; Stage 3 (Release 11), vol. CT WG1, No. V11.1.2, pp. 1-653, XP050555167, 3GPP Standard; 3GPP TS 24.008, Jan. 5, 2012 3rd Generation Partnership Project (3GPP), Mobile Competence Centre; 650, route des Lucioles; F-06921 Sophia-Antipolis Cedex; France.

"3rd Generation Partnership Project; Technical Specification Group Services and System Aspects; System Improvements for Machine-Type Communications (Release 11)", vol. SA WG2,No. V1.6.1, pp. 1-165, XP050555302, 3GPP Standard; 3GPP TR 23.888, Mat. 5,

(56) References Cited

OTHER PUBLICATIONS 2012 3rd Generation Partnership Project (3GPP), Mobile Competence Centre ; 650, route des Lucioles ; F-06921 Sophia-Antipolis Cedex ; France.
International Search Report dated Oct. 4, 2013 for Application No. PCT/EP2013/054747, which the instant application claims priority to, 4 pages.
Written Opinion of the International Searching Authority dated Sep. 12, 2014 for Application No. PCT/EP2013/054747, which the instant application claims priority to, 6 pages.

* cited by examiner

METHODS AND A DEVICE FOR SUPERVISING A HOME WIRELESS SYSTEM

RELATED APPLICATIONS

This application is a 35 U.S.C. 371 national stage filing from International Application No. PCT/EP2013/054737 filed Mar. 8, 2013 and claims priority to European Applications Nos. 12159019.4 filed Mar. 12, 2012 and 12195592.6 filed Dec. 5, 2012, the teachings of which are incorporated herein by reference.

TECHNICAL FIELD

The invention relates to a method and a device for controlling a home wireless system. The home wireless system in general can be any type of wireless system comprising a plurality of peripheral wireless nodes, such as an intruder alarm. Specifically it can be a security system having a plurality of wireless detectors sensitive to the presence or passage of persons and objects communicating with a gateway.

PRIOR ART

Home wireless systems in general comprise a plurality of wireless nodes that can be connected to a communication system through a node control unit or a control panel. An application of home wireless systems is alarm systems. Security and alarm systems used today normally comprise a control panel also referred to as a gateway that is connected to a central station, either by a telephone line or by a wireless telecommunications system such as GSM or other radio frequency systems. The connection also can be through the internet. The gateway can be provided with input means or be activated and controlled by control device such as a keypad which can be a wireless remote device.

The alarm system can be armed in different ways and into different alarm system states, such as "Disarmed", "Armed Home" and "Armed Away". If the system is set to "Disarmed" it will not alarm to perimeter or interior detectors. Still, fire detectors, other gas detectors, flooding events, power break down events and similar detectors normally will be armed also in the "Disarmed" state. If the alarm system is set to a first armed state referred to as "Armed Home" the alarm system will generate an alarm at the occurrence of a breach of a first group of selected detectors such as perimeter detectors and selected interior detectors, but not to a breach of the interior detectors in general. If the system is set to a second armed state referred to as "Armed Away" it will alarm to a breach of the perimeter or interior detectors and normally to all types of detectors.

The state of the system is determined by the needs of the occupants of the premises. If all of the occupants are leaving the premises then the alarm system should be set to "Armed Away". If the occupants will be staying within the premises for an extended period of time then the alarm system can be set to "Armed Home". This alarm setting can be appropriate for instance when the occupants are sleeping within the premises or are staying within a defined part thereof. For other scenarios the alarm system should be set to "Disarmed".

In the "Armed Home" state a selected group of detectors is armed. In various embodiments the selected group of detectors includes the perimeter detectors and interior detectors covering sections of the premises that are not used by the occupants. Each installation can be set up with different detectors included in the selected group.

A prior art alarm system is disclosed in U.S. Pat. No. 6,895,082 and comprises one alarm unit in combination with a line seize module. The alarm unit includes a transmitter/receiver, a control panel function, a key pad, an input/output port connected to a telephone line and an auto dialer for normally communicating with a remote monitoring station over the public switched telephone network.

US20060132303 discloses an RFID security network using system component diversity and system spatial diversity. The security network includes a plurality of network base units, each communicating with a plurality of transponders, or security transmitters. Through appropriate distributive placement of the plurality of base units, along with appropriate placement of the transponders, the redundancy and reliability of the RF communication links between one or more base units and one or more transponders is increased.

U.S. Pat. No. 8,022,843 discloses a wireless sensor network in an aircraft. A plurality of wireless sensors is provided together with a plurality of wireless routers. Multiple routers may send data to one gateway to provide redundancy. Signals from sensors can be routed through different routers to reach a gateway.

Within any one security network in accordance with US20060132303, and at any one particular time, there will generally be only one base unit whose controller function has been assigned to be the master controller for that security network. All other controller functions within other base units will generally be slaved to the master controller. The base unit whose controller function is presently the master controller may sometimes be termed the master controller. The term gateway in the document refers to the functional capability of a base unit that includes a telecom interface. Each base unit can communicate with at least one other base unit and is capable of routing. Each base unit has a unique address.

When there are multiple controller functions installed in a single security network in accordance with US20060132303, the controller functions arbitrate among themselves to determine which controller function shall be the master controller for a given period of time. The preferred arbitration scheme consists of a periodic self-check test by each controller function, and the present master controller may remain the master controller as long as its own periodic self-check is okay and reported to the other controller functions in the security network. If the present master controller fails its self-check test, or has simply failed for any reason or been disabled, and there is at least one other controller function whose self-check is okay, the failing master controller will abdicate and the other controller function whose self-check is okay will assume the master controller role. In the initial case or subsequent cases where multiple controller functions (which will ideally be the usual case) are all okay after periodic self-check, then the controller functions may elect a master controller from among themselves by each choosing a random number.

The gateway of a home wireless system acts as a system or network controller in the home or in a building. A drawback of prior art systems is that a failure of the gateway can disable a complete installation of a home wireless system. In alarm systems such a failure could be extremely inconvenient.

A general object of the invention is to overcome the drawback of prior art systems and to decrease substantially the vulnerability of such systems. At least one second network controller or gateway is installed in the home wireless system and a further object of the invention is to improve the process of binding wireless devices to an available gateway. In various embodiments of the invention a consistent configuration within the system is also achieved.

In a single gateway installation failure of a peripheral wireless node can be detected by the expiration of a supervision timer. Normally a peripheral node transmits a periodic status message at short time intervals, such as 20 minutes. When the single gateway receives the periodic status message, or any other message, from the peripheral device, the gateway will reset the supervision timer.

In a multiple gateway installation supervision of peripheral wireless nodes is more complicated than in a single gateway installation. Even if each peripheral wireless node normally is owned by or assigned to and communicates with a single gateway there need to be procedures to handle situations where a gateway or a wireless peripheral device fails.

SUMMARY OF THE INVENTION

In accordance with the invention a method of controlling a home wireless system is provided. The home wireless system comprises a plurality of wireless nodes including a first gateway and at least one second gateway and at least one wireless peripheral device. The home wireless system forms an installation that can include a conventional home security system that comprises at least one wireless alarm detector and at least two gateways. Each wireless peripheral device repeatedly runs through a link establishment or binding process and is then bound or associated to one gateway.

Generally, a communication path is established between the wireless peripheral device and the associated gateway through a link establishment procedure or a link setup process. The link setup process comprises a link scan, also referred to as discover, a link request and finally a link response. After finalizing the link setup process any communication to and from remote devices is controlled by the associated gateway. In accordance with the invention each gateway is also designed to operate as a system controller in relation to any external systems and a remote central monitoring station (RCMS). Gateways of the system cooperate to automatically distribute system control functions. Each gateway in a multiple gateway cooperative controls a subset of the home wireless system forming a physical installation.

Each wireless peripheral device is associated or bound to one gateway for communication. Each gateway instructs all bound peripheral devices how proceed with the wireless communication. Any messages created in a peripheral device are communicated through and acknowledged by the associated gateway.

Each wireless peripheral device attempts to establish a link to a gateway, should communicated messages sent to the bound gateway not be acknowledged as expected. After establishing a link to and thus binding to a gateway the non-acknowledged message is sent again. In various embodiments wireless peripheral devices or nodes automatically perform a link establishment process referred to as a login procedure when binding to a gateway. The login procedure is used also when the wireless peripheral device establishes a link to a gateway a first time. In the login procedure an identification message is broadcast by the wireless peripheral device. The broadcast of an identification message corresponds to a link scan.

Each gateway receiving the identification message from a wireless peripheral device would be able to bind the wireless peripheral device to itself by responding to the identification message in a predefined way. In various embodiments each gateway that received the identification message delays the transmission of a login or link request message in accordance with a set of rules. The set of rules used for determining the delay can be based on different metrics, such as signal quality metric, previous ownership metric or preassigned rank metric. These metrics are further explained below.

When the wireless peripheral device receives the login request message a link or login response signal is transmitted to complete the login procedure. In various embodiments the login request message includes a session encryption key that the gateway and peripheral device can utilize for secure transmission from then on for every message in each direction.

Each gateway is provided with a first set of communication means for communicating with a remote security server and with a second set of communication means for communicating with peripheral devices and other gateways. At least the second set of communication means are designed for wireless communication. Peripheral devices comprise corresponding means for wireless communication with the gateway.

All nodes share one radio frequency (RF) channel. However, each node must be able to send and receive RF messages to and from other nodes within its subset of the installation while ignoring messages from any other subset. In various embodiments each gateway acts as a master with regard to an RF network comprising the gateway and at least one wireless peripheral device. Other gateways act as masters for their respective RF network.

In various embodiments the RF channel can manually or automatically be changed in case of detecting noise, jamming or other RF transmission problems on the current RF channel. The peripheral devices will adapt to the channel change by logging into the new RF channel at the next transmission.

Each gateway and each peripheral device it controls use specific addresses included in messages. As a result the RF networks are partitioned by a form of CDMA (Code Division Multiple Access). Each gateway will only process messages from the peripheral nodes it controls, and it will ignore messages from peripheral nodes it does not control. Likewise, each peripheral node will only process messages from its controlling gateway.

In various embodiments the gateways used in an installation have longer range of use than the wireless peripheral devices. Some reasons for a better performance can be AC mains power, better RF input filtering, better antennas, and radio diversity. Because of this, multiple gateways may be more likely to be able to communicate with each other, in large premises, than every node is be able to communicate with every gateway. By placing gateways strategically within premises, it can be guaranteed that every peripheral node has an adequate RF communication link with at least one gateway. In installations where the gateways can all communicate with each other, further improved system performance will be provided.

In various embodiments a gateway receiving messages intended for gateways of other installations processes such messages for creating metrics and for monitoring also other installations or systems. Any processed metrics can be used for finding network problems or different kinds of sabotage conditions. The RF communication link between gateways also can be utilized for supervising the network. This could be used for detecting problems caused by RF noise, or intentional sabotage. If a gateway detects or suspects an RF trouble-condition, it can temporary increase the frequency of a supervision cycle on other gateways, to quicker detect and act upon RF trouble.

In an installation all wireless peripheral devices must be distributed automatically among a pool of gateways. Furthermore, if a gateway fails, its peripheral nodes must be redistributed among the pool of surviving gateways. In various embodiments an RF protocol login procedure can be used. When a wireless peripheral device starts up it begins broadcasting an identification message. Every gateway that receives the identification message will try to respond with a login request message. By imposing rules or metrics in the RF protocol login procedure it is possible to proceed further with one gateway only by delaying the gateway login request message.

One metric can be based on link quality. This metric can comprise radio signal quality based on RF signal strength (RSSI), Link Quality Indicator (LQI) that measures the error in the incoming modulation of successfully received packets (packets that pass the CRC criterion) and other similar properties. The better signal quality for the identification message received in a gateway the shorter the delay. Thus, gateways "closer" (better RF link quality) are favoured and gateways "farther" (worse RF link quality) are disfavoured for capturing a particular peripheral node.

Another metric can be based on previous link status in combination with history ownership. If a previous communication link between a gateway and a wireless node had a high quality level a shorter delay is selected. If a gateway previously has owned a peripheral node, the shorter the delay. A peripheral node bound to a gateway is owned by that gateway. This results in a more stable network topology; a peripheral node normally will not alternate between two gateways with equal signal quality metrics.

A further metric can be based on preassigned rank. A particular gateway can be favoured and be instructed to use a shorter delay. In this way more wireless peripheral devices will be bound to this gateway. Different metrics can be combined.

In various embodiments a fail-over procedure is automatically initiated if a gateway fails. In such a case its peripheral nodes are automatically and transparently transferred to another surviving or operative gateway. In a single gateway installation, a peripheral node that has an event (such as an alarm) to report, will attempt to send an RF message to the bound or associated gateway. If the gateway fails to acknowledge the message, the peripheral node will retry a few times and then begin the login procedure again by broadcasting the identification message.

From a peripheral node's perspective, fail-over in a multiple gateway cooperative is no different from a situation where the link is lost to a single gateway. If a gateway fails, the next time a peripheral node it owned attempts to transmit a message, it will fail and begin the login procedure again by broadcasting the identification message. This time, however, another operative gateway will send a login request message first and capture the peripheral node. After the peripheral node has completed the login procedure, it will transmit again the original event message to its new RF master gateway. Thus, fail-over from a failed gateway to a surviving gateway has occurred automatically and transparently.

A new link establishment process will also take place if the communication link between a gateway and a wireless node is broken. This may happen when radio signals are blocked or disturbed by objects or interference from other radio signal sources.

A home wireless system in general and an alarm system in particular has a large amount of system configuration information, such as alarm detector definitions, user PIN codes, gateway distribution, gateway assignments, etc. The system configuration information should be persistent and distributed along all gateways in a multi-gateway installation. Unless the information is identical among the gateways the system may behave erratically. For example, if a door contact has been added to the system, and the door contact configuration has been pushed to one gateway but not to another, the door contact may or may not function correctly.

In various embodiments the persistent system configuration information is stored in a remote central monitoring station (RCMS). The information is pushed from the RCMS to the gateways of the installation. There is also other information stored in the RCMS such as about operative and failing gateways and wireless peripheral devices.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
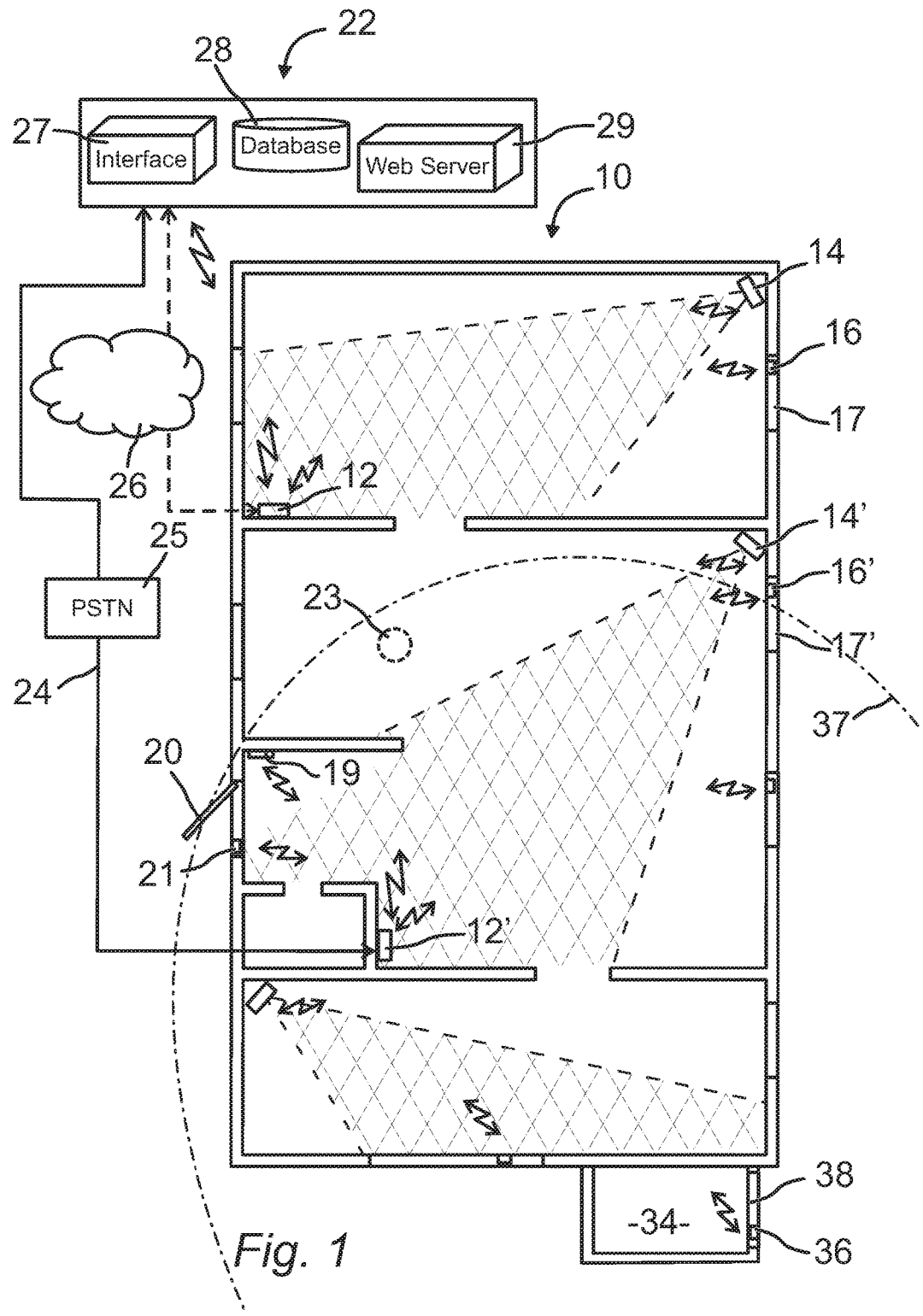
FIG. 1 is a schematic view of an installation of a home wireless system controlled in accordance with one embodiment of the invention.

In the embodiment shown in FIG. 1 a home wireless system is installed in a building 10. The home wireless system is an alarm system installation and comprises a plurality of wireless peripheral nodes including wireless peripheral devices, a first gateway 12 and a second gateway 12'. One wireless peripheral node is a first infrared detector 14 mounted in the corner of a room close to the ceiling. The first infrared detector 14 has a sensing area that covers the first gateway 12. A first perimeter alarm detector 16 is mounted at a window 17 in the same room. The infrared detector operates in a conventional manner to detect presence and movements of objects emitting infrared radiation. The perimeter alarm detector also operates in a conventional manner to detect when a door or a window is opened. In various embodiments the perimeter alarm detector comprises a magnetic sensor that will detect when a magnet attached to the door or window is moved.

A second gateway 12' is arranged in a second room separated from the room where the first gateway 12 is arranged. A second infrared detector 14' is mounted in the same room as the second gateway 12' to cover it within its operative area and a second perimeter alarm detector 16' is mounted at a window 17' in the same room. A keypad 19 is mounted close to a front door 20 of the building 10. The keypad 19 is used by an operator of the alarm system to arm and to disarm the alarm system. Also the keypad 19 is a wireless peripheral node. The front door 20 is covered by a third perimeter alarm detector 21. Another type of wireless peripheral device is a smoke detector 23 mounted in the ceiling of building. In various embodiments a plurality of smoke detectors 23 are arranged throughout the building 10 to ensure that fire can be detected at an early stage.

Depending on different circumstances the first gateway 12 and the second gateway 12' are connected to a remote central monitoring station 22 either through a wired connection 24 or through a wireless connection. The connection to the remote central monitoring station 22 can also be through the internet 26. The wired connection 24 can be part of a public switched telephone network 25. In various embodiments the remote central monitoring station 22 comprises an interface module 27, a database 28 and a web server 29. The database 28 stores installation and application data relating to the installation including all wireless network nodes and alarm settings.

During initial installation of a prior art system each peripheral node attaches to the single gateway in accordance with a specific login procedure. The peripheral node broadcasts an RF signal comprising an identification message including a unique identification number referred to as the node ID. The single gateway receives the broadcast identification message and examines the node ID. If that node ID is part of the gateway's installation, it responds to the identification message with the transmission of a login request message specifically addressed to the peripheral node that broadcast the identification message. In various embodiments installation and application data including the node ID of all peripheral nodes included in an installation are stored in the remote central monitoring station 22 and are transferred to the gateway. A home wireless system installation can comprise a plurality of different applications, such as alarm, monitoring, measuring and other services.

In various embodiments the login request message includes a temporary session encryption key that is used by the gateway and the peripheral node for communicating in both directions. After receiving the login request message the peripheral node responds with the transmission of a login response message specifically addressed to the gateway to complete the login procedure. All RF messages sent from a wireless peripheral device are acknowledged by the gateway that receives and processes the message in an acknowledgement procedure.

In an installation in accordance with the invention as shown in FIG. 1 a first gateway 12 and a second gateway 12' are included in the installation. Both gateways are connected to the remote central monitoring station 22 and have received information regarding the installation. The remote central monitoring station 22 also comprises conventional means for receiving alarm signals from gateways of an installation. The installation procedure of the installation shown in FIG. 1 starts with the same sequence that is described above. A wireless peripheral device, such as the first infrared detector 14, broadcasts an identification message that could be received by the first gateway 12 and the second gateway 12'.

In accordance with the invention only one gateway binds the broadcasting wireless peripheral device to itself. In various embodiments a gateway that receives an identification message delays the transmission of the login request message. The delay is based on metrics. In one embodiment of the invention the metrics is a signal quality metric. A gateway receiving the identification message measures or determines the signal quality of the received signal. The better the signal quality of the identification message received by the gateway the shorter the delay.

As a result a gateway arranged in such a relation to the peripheral device that a better signal quality is achieved is favored before other present gateways. The favored gateway will be the first to send a login request message and consequently will bind the peripheral device to itself. Other gateways of the installation also may transmit login request messages but these will not be processed and accepted by the peripheral device because it then is already bound to the first gateway.

Another metric can be based on previous ownership or previous link status. If a peripheral node previously has been bound to a specific gateway with good communication link quality a shorter delay can be used by the gateway. This results in a more stable network topology; a peripheral node will not alternate between two gateways with equal signal quality metrics.

A further metric can be based on preassigned rank. In some installations it would be preferred to bind a specific gateway to a specific peripheral device. In such cases the delay in the gateway can shortened. The different metrics can be combined in an installation.

The described login procedure also provides redundancy and an automatic fail-over function. Should a gateway bound to one or a plurality of wireless peripheral devices fail all bound wireless peripheral devices automatically and transparently will be transferred to another gateway. In various embodiments the acknowledgement procedure is used to ensure this function. If no acknowledgement message is received in a wireless peripheral device after transmitting a message, the wireless peripheral device will retry a few times within a comparatively short time period. The message sent by the wireless peripheral device could be an alarm message, a periodic status message or another type of message. A periodic status message is broadcast by all peripheral devices at some intervals.

In the embodiment shown in FIG. 1 the first infrared detector 14 which is bound to the first gateway 12 detects movement of an object in the detection area (marked). An alarm signal message is transmitted and should be received and processed by the first gateway 12, which is associated with and previously has been bound to the first infrared detector 14. However, for some reason the first gateway is not able to transmit an acknowledge signal or for some reason the acknowledge signal is blocked or disturbed. After a few attempts of sending the message again the first infrared detector will begin the login procedure again by broadcasting the identification message.

Since the identification message is broadcast all gateways in the installation receive the identification message. If the previously associated gateway, that is the first gateway 12, does not respond the second gateway 12' will respond with a login request message including a temporary session encryption key. The first infrared detector 14 then will bind to the second gateway 12' by sending a login response signal using the temporary session encryption key received from the second gateway 12'. Following the login procedure the original alarm signal message is again transmitted also with use of the temporary session encryption key received from the second gateway 12'. After receiving the original alarm signal the second gateway 12' then can send an alarm message to the remote central monitoring station 22 in accordance with normal routines. The second gateway 12' also informs other gateways that the wireless peripheral device now is owned by it.

Where the first gateway 12 as well as the second gateway 12' receive and process the identification message broadcast by the first infrared detector 14 a metric as set out above will be utilized. As a result either the first gateway 12 or the second gateway 12' will transmit the login request message. Using the metric based on signal quality or signal strength the first gateway 12 will be applying a shorter delay and be the first gateway to respond. Also using the metric based on previous ownership or previous link status will result in the first gateway 12 responding first and thereby binding the first infrared detector 14. The third metric based on a predefined setup or assignment may lead to another result, should the second gateway 12' be a higher ranked unit.

A situation similar to a failure situation involves a gateway restart. Since the session encryption keys between the gateway and its peripheral nodes are temporary, all nodes will be marked logged out when the gateway restarts. However, a peripheral node does not know it has been logged out until it attempts to send the next RF message (perhaps an alarm message, perhaps only periodic status). That message transmission and its retries, using the previous temporary session encryption key, will fail, and the peripheral node will begin the login procedure again by broadcasting the identification message. After it has completed login, will transmit the original event message again using the new temporary session encryption key.

In the embodiment shown in FIG. 1 a small storeroom 34 is arranged as an annex connecting to the building 10. A third perimeter alarm detector 36 is arranged at a storeroom door 38. Due to fact that several walls separate the third perimeter alarm detector 36 and the first gateway 12 radio frequency signals that are transmitted from the third perimeter alarm detector 36 do not reach the first gateway 12 in a satisfying way. The range of the third perimeter alarm detector 36 is indicated at line 37. The shorter distance and fewer walls in respect of the second gateway 12' allows it to properly receive the radio signals transmitted by the third perimeter alarm detector 36.

During a login procedure initiated by the third perimeter alarm detector 36 no login response message is transmitted from the first gateway 12 because it does not receive signals having appropriate signal qualities. In various embodiments the gateways in an installation are provided with more powerful radio transmitting means than the wireless peripheral devices. This could be because the gateways comprise higher capacity power supplies or are connected to a power line. The second gateway 12' receives a radio signal that complies with presently applied standards and sends a login response message in accordance with the procedure described above.

The first gateway 12 still can be capable of communicating with the second gateway 12' as a result of the more powerful radio transmitting means and may communicate information about the third perimeter alarm detector 36. By placing gateways strategically within a building it is possible to guarantee that every peripheral node has an adequate RF link with at least one gateway. As long as the gateways can all communicate with each other, the installation will function properly. To achieve full redundancy the installation should include enough gateways for every peripheral node to be able to communicate with at least two gateways.

An installation such as the alarm system shown in FIG. 1 holds a large amount of dynamic state information, such as arm state, alarm status, peripheral battery status, etc. in a total system state information dataset. Similar information is stored also in other types of home wireless systems. An alarm system with distributed gateways operating as system controllers should synchronize state among the controllers. However, in various embodiments only a small subset of the total system state information dataset needs to be strictly synchronized for successful operation.

Many data items, especially those pertaining to peripheral nodes, can be recreated as necessary. In accordance with various embodiments of the invention only higher level, abstract system state changes (e.g. entry alarm) rather than low level events (e.g. a specific smoke detector reporting low battery status) are synchronized. As a further example, only the gateway a peripheral node is attached to really needs to track the peripheral's contact status. If that gateway fails, and the node logs into another gateway, after completing login the peripheral node will send the new gateway a contact state message containing the violation state of all the node's detector contacts. This scheme minimizes the amount of information that needs to be synchronized between gateways in the cooperative, and minimizes also the resulting RF message traffic.

In various embodiments a second gateway can utilize the RF communication link of another gateway for tunnelling messages to a remote central monitoring station (RCMS). For example if the second gateway up-link to RCMS is very slow or unreachable, or has a higher cost, another gateway up-link can be utilized.

A home wireless system has a large amount of persistent system configuration information. An alarm system holds information such as alarm detector definitions, user PIN codes, etc. This configuration, which is stored in the central monitoring station and is pushed to each gateway from the central monitoring station, should be identical among the gateways in a multi-gateway installation or the system may behave erratically. For example, if a perimeter alarm detector has been added to the system, and the perimeter alarm detector configuration has been pushed to one gateway but not to another, the new perimeter alarm detector may or may not function correctly. It is therefore important to guarantee that configuration is consistent among all the gateways in a multi-gateway installation. For this reason a home wireless system configuration characteristic can be generated and distributed from the RCMS to the gateways of the installation.

In various embodiments the remote central monitoring station, RCMS, generates a strictly increasing configuration revision number every time the installation's gateway configuration (which is shared by all gateways in the multi-gateway installation) changes. This configuration revision number is pushed as a configuration characteristic to each gateway along with whatever configuration data has changed.

Each gateway includes its configuration revision number in a periodic status messages that it sends to other gateways in the multi-gateway installation. When each gateway receives periodic status from another gateway, it compares its configuration revision number to that in the periodic status message. If the other gateway's configuration revision number is greater, indicating newer configuration, the receiving gateway will send a special report message to the central monitoring station and request a configuration update. In this way, when new configuration is received in one gateway in the multi-gateway, the changes will quickly propagate to all other gateways. Normally, it is not possible for the central monitoring station to push new configuration to all the gateways in an installation directly, because a gateway is protected behind a network firewall or a similar protection scheme. In such installations the central monitoring station has to wait until the gateway opens a communication session and sends out a report, through the firewall, to the central monitoring station. When the communication session is opened updated information can be transferred from the central monitoring station to the gateway.

In various embodiments an update of state or configuration could be detected by arranging the first gateway to calculate a checksum of all states and configuration. This checksum can then be monitored by any other gateway. If the checksum changes, the other gateway determines that the state or configuration is changed. Such a change can be used by the second gateway to start an update as well.

Another characteristic than can be used to compare configurations would be the age of the configuration. This age could either be the age of the most recent change (timestamp calculated by the RCMS) or the age of the configuration download to the gateway (timestamp calculated by the gateway). If the age is calculated by the RCMS, it is effectively the same as the revision number characteristic described above, provided that time within whole system increases monotonically (as UTC time does).

The responsibility for supervising peripheral nodes is distributed among the gateways of a multiple gateway installation. As each peripheral node logs into a gateway, that gateway transmits an ownership change message to other gateways. A supervision timer is started in the gateway for the peripheral node now owned by the gateway. A gateway receiving an ownership changing message from another gateway then marks the peripheral node as owned by another gateway and suspends the supervision timer for it. When a gateway receives a periodic status or any other message from a peripheral node, it will reset the associated supervision timer. If a supervision timer for a particular peripheral node expires, then that peripheral node is marked as failed and a report is transmitted to other gateways of the multiple gateway installation and also to the RCMS.

In various embodiments, each gateway supervises every other gateway. Each gateway maintains a supervision timer for every other gateway, just as for peripheral nodes owned by that gateway. When a gateway receives a periodic status or any other message from a particular gateway, it will reset the associated supervision timer. If a supervision timer for a particular gateway expires, then that gateway is marked as failed and a report transmitted to the RCMS. Furthermore, all peripheral nodes formerly owned by the failed gateway are now marked as unowned and the supervision timers for them restarted.

If the failed gateway has truly ceased operation or been destroyed, its peripheral nodes will begin to log into other peer gateways in accordance with the procedure set out above. Any peripheral node that fails to log into before its supervision timer expires will also be marked as failed and a report will be transmitted to the RCMS. It may be the case that the RF link between gateways has failed or has been blocked or jammed, rather than a gateway itself. In this case, each gateway will report the other as failed to the RCMS but maintain its own peripheral nodes, resulting in a "split system". Each gateway will eventually report the other gateway's nodes as failed. This situation will be detected and resolved by the RCMS.

Whenever a gateway detects a link state change, such as to an owned wireless peripheral device information about the new state can be reported to other gateways. As a result the information will be distributed throughout the home wireless system.

In the embodiment shown in FIG. 1 the third perimeter alarm detector 36 is owned by the second gateway 12'. A supervision timer is set up in the second gateway 12' for the third perimeter alarm detector 36. In various embodiments another supervision timer is set up also for the first gateway 12. When the second gateway 12' receives a periodic status or any other message from said third perimeter alarm detector 36, it will reset the associated supervision timer. If the supervision timer for said third perimeter alarm detector 36 expires, then said third perimeter alarm detector 36 is marked as failed and a report is transmitted to said first gateway 12 and also to the RCMS 22.

Figure 2:
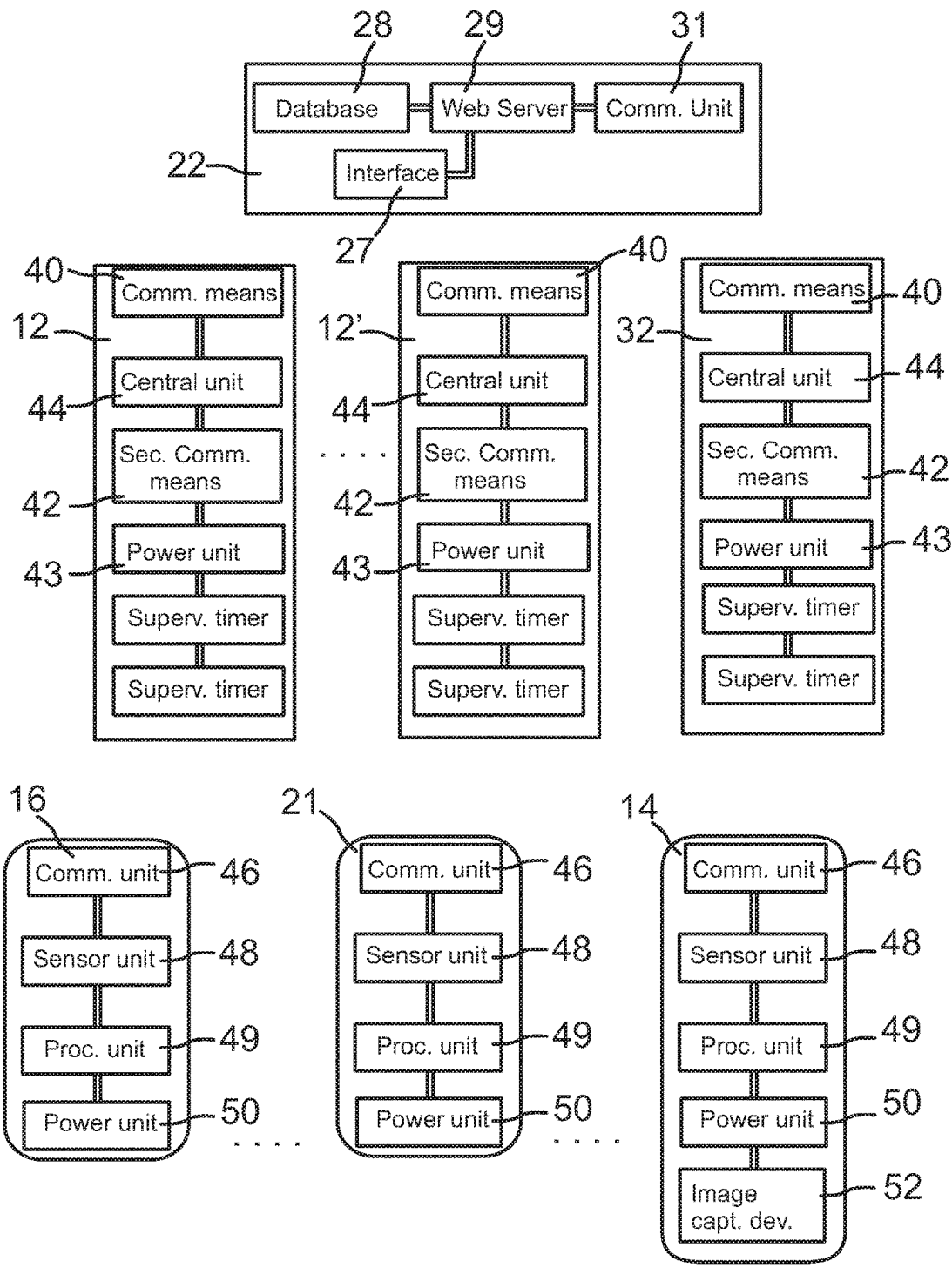
FIG. 2 is a schematic block diagram showing an embodiment of an installation in accordance with the invention.

The schematic view in FIG. 2 shows a basic installation with one remote central monitoring station 22, a first gateway 12, a second gateway 12' and a third gateway 32. A plurality of wireless peripheral devices is also included in the installation. The remote central monitoring station 22 normally is connected to and handles a plurality of installations. A database 28 stores separately data relating to each installation. Such data can include installation configuration and user or owner data. An interface module 27 allows users to interact with the database and to change some settings of the installation. I various embodiments the interface module 27 is arranged to exchange data through the internet. A control and communications unit 31 controls the function of the remote central monitoring station and the communication with all associated gateways. The control and communications unit 31 comprises a timing unit (not shown) such as a conventional clock.

Each gateway comprises first communication means 40 for communication with radio frequency signals and second communication means 42 for communication with remote units such as the remote central monitoring station 22. The second means for communication is capable of communicating over the internet, Ethernet, WiFi and/or over telephone lines. In various embodiments the second means for communication comprises cellular telephone module for communication by GSM, GPRS, 3G, 4G/LTE and similar telecommunication standards. Each gateway further comprises a central unit 44 with memory means and a first timing unit 45 such as a conventional clock. The first timing unit 45 is used to maintain a supervision timer for monitoring other units, nodes and devices.

The central unit 44 maintains in the memory means data relating to the installation and communication settings such as temporary encryption keys used during communication with associated wireless peripheral devices. The first communication means 40 is used also for communicating with other gateways present in the installation. A power unit 43 provides the power used by the gateway. In various embodiments the power unit 43 is connected to the mains of the premises.

Said first communication means 40 is arranged to receive and to detect the signal strength and the signal quality of radio signals. When a gateway 12 receives a radio signal comprising the identification message from a peripheral device the quality and strength of the signal is determined in said first communication means 40. A result of the determination is transferred to the central unit 44 where further analysis is performed based on which metric is used in the present system.

The memory means of the central unit 44 of the gateways also stores data relating to all bound wireless peripheral devices. In various embodiments the memory means of the central unit 44 of the gateways also stores data received from the remote central monitoring station relating to previously bound wireless peripheral devices and various ranks of different wireless peripheral devices. These data can be used during a link establishment process as described above when other metrics are used.

Each wireless peripheral device basically comprises a wireless communication unit 46 used for all communication with a gateway, a sensor unit 48, a processing unit 49, a power supply unit 50 and a second timing unit 51. Different wireless peripheral devices comprise different types of sensor units 48, such as infrared sensor, magnetic sensor, smoke detector, motion detector and temperature sensor. In various embodiments an image capturing device 52 such as a video camera or digital camera is also included in the wireless peripheral device. In the embodiment shown in FIG. 2 the image capturing device 52 is arranged in an infrared detector 14.

Figure 3:
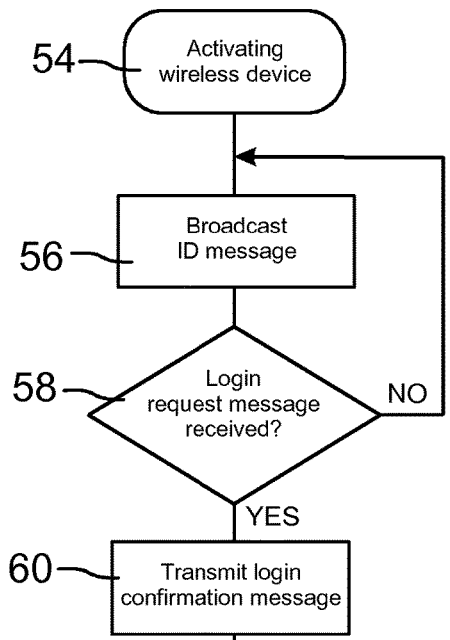
FIG. 3 is a schematic flow chart of a general link establishment process of a wireless peripheral device used in accordance with the invention.

The link establishment process of a wireless peripheral device into the home wireless system is shown in FIG. 3. In various embodiments installation information comprising identification data, setup data and application data of each wireless peripheral device and data defining the type of wireless device is maintained in the remote alarm receiving centre 18. The installation information also is transferred to each one of the gateways of the installation. As shown in FIG. 3 a binding wireless peripheral device first is activated in block 54 and then initiates the link establishment process by broadcasting an identification message in block 56. The identification message includes an address of the wireless peripheral device.

The identification message is broadcast as a radio frequency signal (RF) and will be received by all gateways receiving a sufficiently strong radio signal. In accordance with the invention all gateways receiving the signal will apply a scheme before transmitting a reply message as set out above. The scheme will ensure that a reply message will be sent first from one responding gateway as a login request message as depicted in block 58. The login request message is directed specifically to the binding wireless peripheral device by including in the login request message the address of the binding wireless peripheral device. The login request message includes also an address of the responding gateway. If no login request message is received in the binding wireless peripheral device the process will continue in block 56 by broadcasting the identification message again.

In various embodiments a temporary session encryption key is generated in the responding gateway. The temporary session encryption key is included in the login request message. The responding gateway and the binding peripheral node will use the temporary session encryption key from then on for every message in each direction. Each message will also be directed to a specific receiving gateway or wireless peripheral device by including in the message the appropriate address.

As soon as a login request message is received in the binding wireless peripheral device it will transmit a login confirmation message as depicted in in block 60. The login confirmation message is directed specifically to the responding gateway by the inclusion of appropriate address. As a result the link establishment process is completed, the wireless peripheral device is bound to one gateway and a communication path is established.

Figure 4:
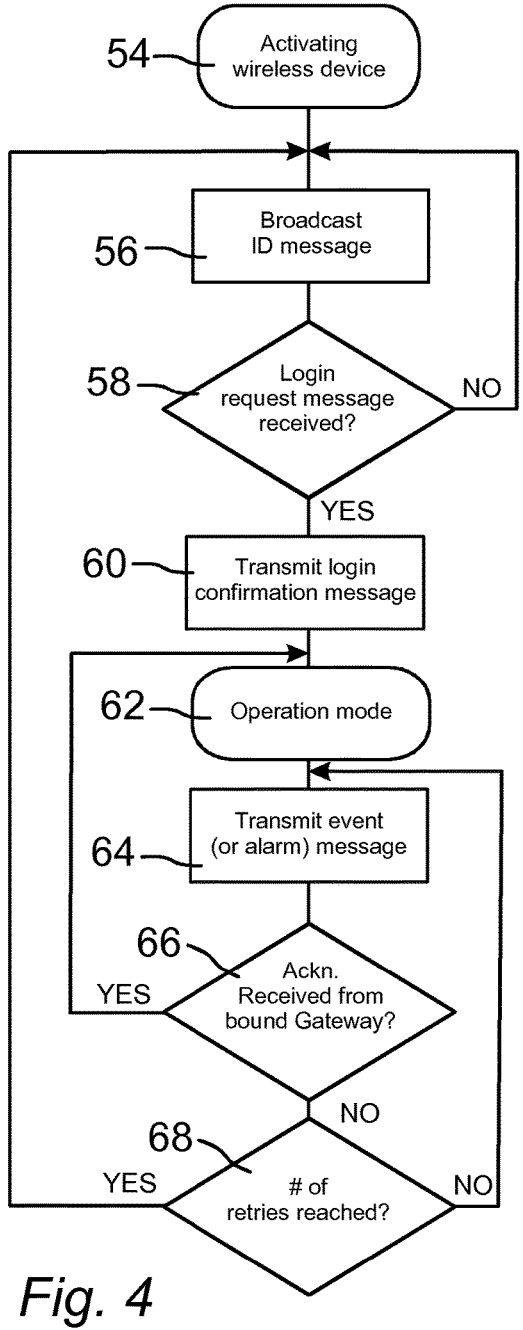
FIG. 4 is a schematic flow chart showing a process of a wireless peripheral device in a home wireless system in accordance with the invention including a link establishment process.

An operational process of a home wireless system in accordance with the invention shown in FIG. 4 includes a link establishment process as described above with reference to FIG. 3. When a login confirmation message is transmitted in the wireless peripheral device it will enter an operation mode as depicted in block 62. In an alarm installation it can correspond to an enabled mode where a sensor in the wireless peripheral device is enabled. Any event triggering a sensing unit of the wireless peripheral device, or presence of a previously occurred event (see below), will result the transmission of an alarm message as depicted in block 64. The message can also be an event message informing the gateway about low battery or other status information of the bound wireless peripheral device.

After transmitting the alarm or event message the wireless peripheral device checks in block 64 if an acknowledgement message is received from the bound gateway. During normal conditions an acknowledgement message is received and the wireless peripheral device returns to the operation mode in block 62. The alarm event or any other message is handled by the bound gateway in a conventional manner.

Should an acknowledgement message not be received, for instance because the bound gateway is malfunctioning or radio transmission is disturbed, a fail-over process is initiated and a check is made in block 68 if a predetermined number of retries of transmitting the event messages has been reached. If this is not the case the process returns to block 64 and the event messages is again transmitted. If a predetermined number of retries has been made it is concluded that the bound gateway is more permanently out of order, or that no contact can be established. The process returns to block 56 and a new login process is initiated. When reaching block 62 a previously occurred and unacknowledged event signal still will be present. As a result the process will continue in block 64 by transmitting the unacknowledged event signal.

In various embodiments a common situation occurs when a gateway is restarted. After a restart of a gateway all wireless peripheral devices included in the installation are considered logged out from the gateway. As a result any messages received from a wireless peripheral device after restart will not be processed and will not be acknowledged by the gateway. As soon as an identification message is received from a wireless peripheral device the login process starts in the gateway as set out above by the transmission of a login confirmation message.

Figure 5:
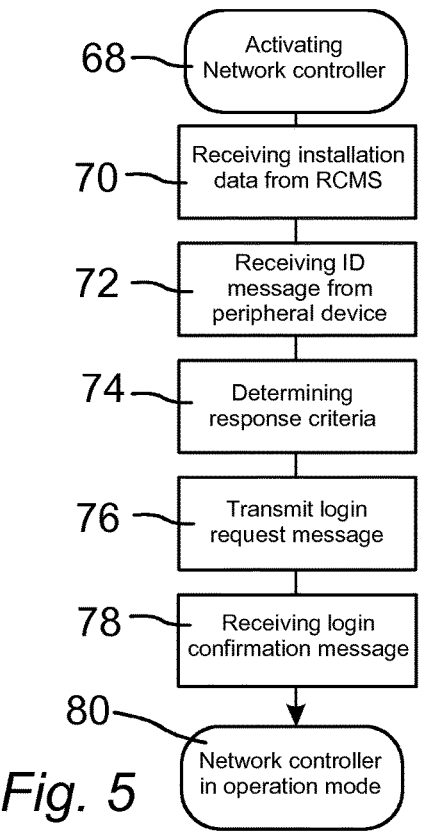
FIG. 5 is a schematic flow chart showing a process in a network controller in a home wireless system in accordance with the invention including a link establishment process.

One embodiment of a process of starting or restarting a network controller or a gateway 12 is shown in FIG. 5. In block 68 the gateway is activated. A contact then is established between a remote central monitoring station (RCMS) and the gateway. The gateway receives in block 70 a set of installation and application data from the RCMS including the preferred metrics to be used during a link establishment process. The data also can include information relating to previously bound wireless peripheral devices.

After receiving installation and application data from the RCMS the gateway 12 is prepared in block 72 to receive an ID message from wireless peripheral devices of the installation searching for a gateway. When an ID message has been received the central unit 44 the gateway 12 determines in block 74 response criteria based on data received from the RCMS. At least one of the metrics as set out above is utilized for calculating a delay. In various embodiments different criteria and metrics are combined and weighted. Signal strength and signal quality, previous relationship with wireless peripheral device, that is whether the wireless peripheral device recently or ever was bound to the gateway, and other criteria can be used.

Based on the selected metrics and detected signal strength and or signal quality a login request message is transmitted in block 76. In various embodiments a delay is calculated on the bases of the selected metrics and detected signal strength and or signal quality and the login request message is transmitted after said delay. The wireless peripheral device that transmitted the ID message will receive the login request message and reply with a login confirmation message that is received in the gateway in block 78. After receiving the login confirmation message the gateway or network controller is in operation mode as shown in block 80.

When the home wireless system is in operation the RCMS continuously keeps track of the status and configuration of the installation. Data such as alarm detector definition, user PIN codes, gateway arrangement, etc. forms a large amount of persistent system configuration information that is updated, stored and monitored in the RCMS. In various embodiments the gateway generates a strictly increasing configuration revision number every time there is a change in a gateway configuration in a multi-gateway installation. The configuration revision number is included in or forms the basis of the persistent system configuration information When a communication path is established between the RCMS and network controllers or gateways of the system the configuration information is transferred to and stored in the gateways. As the communication path is established the configuration information is received from the RCMS. The received configuration information is forwarded to other gateways during communication sessions normally taking place in the system for instance for communicating periodic status messages.

After receiving the configuration information, such as the configuration revision number characteristic, the gateway compares the received configuration information with the previously stored configuration information. If the received configuration information is not identical to the stored configuration information the gateway will establish a communication path the RCMS and report a mismatch. A configuration update will be requested if the received information is considered more recent than the stored information. This situation will occur if the received persistent system configuration information includes a configuration revision number that is greater than the stored configuration revision number. If the received configuration information on the other hand is identical the gateway continues in operation mode.

In various embodiments added precaution is achieved by calculating a configuration checksum. The configuration checksum is calculated before and included in every periodic status message from one gateway to another, in order to detect and correct discrepancies as soon as possible. The configuration checksum is based on details of the home wireless system configuration such as number of and configuration of gateways 12; 12'; 32 and peripheral wireless nodes 14; 16; 19; 21; 23. When each gateway receives periodic status from another gateway, it also recalculates the checksum. The checksums are compared and if there is a mismatch, the receiving gateway will send a message, referred to as "REPORT_CONFIG_MISMATCH" report to the RCMS and request a configuration update. If the checksums are determined to be equal the gateway stays in the operation mode.

There could also be a situation where the configuration information, such as the revision number characteristic, which is generated by the RCMS and received in a gateway, is identical to a previously stored configuration characteristic while the checksums are not identical. In such a case there will be an uncertainty in both gateways about the configuration status. The process as described above will be followed as set out in block 90 by both gateways. As a result configuration mismatches appearing in the system will be resolved quickly, irrespective of the source of the mismatch (RCMS, local user, bit errors, etc.

In various embodiments placement of data items in the memory means of the gateway central unit 44 is not fully determined. In these cases, the checksum has to be calculated in an order independent manner. Still, the content of the information stored in the gateways needs to be identical even if the placement of the information is no identical.

In various embodiments the age of the configuration information is used in the home wireless system configuration characteristic. The age could be the age of the most recent change defined as a timestamp determined by the RCMS or the age of the configuration download to the gateway defined as a timestamp determined by the gateway. Where the age is calculated and determined by the RCMS it will effectively be the same as the revision number, provided that time within the home wireless system increases monotonically. The timestamps can be generated by the timing units of the RCMS and each of the gateways.

While certain illustrative embodiments of the invention have been described in particularity, it will be understood that various other modifications will be readily apparent to those skilled in the art without departing from the scope and spirit of the invention. Accordingly, it is not intended that the scope of the claims appended hereto be limited to the description set forth herein but rather that the claims be construed as encompassing all equivalents of the present invention which are apparent to those skilled in the art to which the invention pertains.

The invention claimed is:

1. A method for supervising a wireless home alarm system, wherein the wireless home alarm system comprises a plurality of peripheral wireless alarm detectors, the peripheral wireless alarm detectors comprising at least a first infrared detector and at least a first perimeter alarm detector, a first gateway having a first wireless communication means for communicating with and controlling associated peripheral wireless alarm detectors, and a second communication means for communicating with a remote central monitoring system, the method comprising:
   a. installing at least one second gateway in the wireless home alarm system, each of the peripheral wireless alarm detectors being assigned to and controlled by one of the first gateway and the at least one second gateway;
   b. communicating all messages created in each peripheral wireless alarm detector through and acknowledging such messages in the associated gateway controlling the peripheral wireless alarm detector only;
   c. maintaining in each gateway a supervision timer for each assigned peripheral wireless alarm detector;
   d. transmitting from each of the peripheral wireless alarm detectors a periodic status message;
   e. resetting in each gateway said supervision timer when receiving the periodic status message from an assigned peripheral wireless alarm detector;
   f. reporting from the first gateway to the at least one second gateway an assigned peripheral wireless alarm detector as failed when no periodic status message has been received within a predefined time period;

g. reporting from the first gateway and from said at least one second gateway to the remote central monitoring system a peripheral wireless alarm detector as owned when an assignment process is completed;

h. reporting form the first gateway to the remote central monitoring system the peripheral wireless alarm detector as failed when no periodic status message has been received within the predefined time period; and i. storing in the remote central monitoring system information indicating the peripheral wireless alarm detector as failed.

2. The method as claimed in claim 1, further comprising:

a. maintaining in said first gateway a supervision timer for said at least one second gateway, b. transmitting from said at least one second gateway a periodic status message, c. resetting in said first gateway said supervision timer when receiving a periodic status message from said at least one second gateway, d. reporting from the first gateway to the remoted central monitoring system said at least one second gateway as failed when no periodic status message has been received within a predefined time period, and e. storing in said remote central monitoring system information indicating the at least one second gateway as failed.

3. A wireless home alarm system comprising:

a plurality of peripheral wireless alarm detectors, the peripheral wireless alarm detectors comprising at least a first infrared detector and at least a first perimeter alarm detector;

a first gateway having a first wireless communication means for communicating with and controlling associated peripheral wireless alarm detectors, and a second communication means for communicating with a remote central monitoring system;

at least one second gateway, each of the peripheral wireless alarm detectors being assigned to and controlled by one of the first gateway and the at least one second gateway, each gateway maintaining a supervision timer for each assigned peripheral wireless alarm detector, wherein the system performs the following steps:

a. communicating all messages created in each peripheral wireless alarm detector through and acknowledging such messages in the associated gateway controlling the peripheral wireless alarm detector only;

b. transmitting from each of the peripheral wireless alarm detectors a periodic status message;

c. resetting in each gateway said supervision timer when receiving the periodic status message from an assigned peripheral wireless alarm detector;

d. reporting from the first gateway to the at least one second gateway an assigned peripheral wireless alarm detector as failed when no periodic status message has been received within a predefined time period;

e. reporting from the first gateway and from said at least one second gateway to the remote central monitoring system a peripheral wireless alarm detector as owned when an assignment process is completed;

f. reporting form the first gateway to the remote central monitoring system the peripheral wireless alarm detector as failed when no periodic status message has been received within the predefined time period; and g. storing in the remote central monitoring system information indicating the peripheral wireless alarm detector as failed.

4. The system as claimed in claim 3, wherein the system further performs the following steps:

a. maintaining in said first gateway a supervision timer for said at least one second gateway, b. transmitting from said at least one second gateway a periodic status message, c. resetting in said first gateway said supervision timer when receiving a periodic status message from said at least one second gateway, d. reporting from the first gateway to the remoted central monitoring system said at least one second gateway as failed when no periodic status message has been received within a predefined time period, and e. storing in said remote central monitoring system information indicating the at least one second gateway as failed.

* * * * *